US010795217B2

(12) United States Patent
Chen

(10) Patent No.: US 10,795,217 B2
(45) Date of Patent: Oct. 6, 2020

(54) LIQUID CRYSTAL GRATING AND FABRICATION METHOD THEREOF, AND NAKED EYE 3D DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Yuqiong Chen, Beijing (CN)

(73) Assignees: BOE TECHNOLOGY GROUP CO., LTD., Beijing (CN); BEIJENG BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/397,840

(22) Filed: Apr. 29, 2019

(65) Prior Publication Data

US 2019/0317371 A1 Oct. 17, 2019

Related U.S. Application Data

(63) Continuation of application No. 14/908,298, filed as application No. PCT/CN2015/084174 on Jul. 16, 2015, now Pat. No. 10,324,338.

(30) Foreign Application Priority Data

Dec. 16, 2014 (CN) .......................... 2014 1 0784528

(51) Int. Cl.
*G02F 1/1343* (2006.01)
*G02B 30/27* (2020.01)
(Continued)

(52) U.S. Cl.
CPC ....... *G02F 1/134309* (2013.01); *G02B 30/27* (2020.01); *G02F 1/0316* (2013.01);
(Continued)

(58) Field of Classification Search
CPC combination set(s) only.
See application file for complete search history.

(56) References Cited

U.S. PATENT DOCUMENTS

2006/0139548 A1 6/2006 Ahn
2006/0146208 A1 7/2006 Kim
(Continued)

FOREIGN PATENT DOCUMENTS

CN 102540494 A 7/2012
CN 102707515 A 10/2012
(Continued)

OTHER PUBLICATIONS

International Search Report dated Oct. 13, 2015; PCT/CN2015/084174.

(Continued)

*Primary Examiner* — Lauren Nguyen

(57) ABSTRACT

A liquid crystal grating and a fabrication method thereof, and a display device are provided. The liquid crystal grating comprises a first substrate (1) and a second substrate (2) provided opposite to each other, and a liquid crystal layer (7); a plate-shaped transparent substrate (3) is provided on the first substrate (1), and a second transparent conductive layer (4), a transparent insulating layer (5) and a first transparent conductive layer (6) are sequentially provided on the second substrate (2); the first transparent conductive layer (6) includes first strip-shaped transparent electrodes (61) and second strip-shaped transparent electrodes (62) which are alternately provided, and there is a gap between the first strip-shaped transparent electrode (61) and the second strip-shaped transparent electrode (62) adjacent to each other; and the second transparent conductive layer (4)

(Continued)

includes third strip-shaped transparent electrodes (41) provided at intervals. The liquid crystal grating reduces a black stripe.

20 Claims, 5 Drawing Sheets

(51) Int. Cl.

| | |
|---|---|
| ***G02F 1/155*** | (2006.01) |
| ***G02F 1/03*** | (2006.01) |
| ***G02F 1/1333*** | (2006.01) |
| ***G02F 1/1341*** | (2006.01) |
| ***G02F 1/1335*** | (2006.01) |

(52) U.S. Cl.

CPC .......... *G02F 1/0322* (2013.01); *G02F 1/1341* (2013.01); *G02F 1/13439* (2013.01); *G02F 1/133345* (2013.01); *G02F 1/155* (2013.01); *G02F 1/133512* (2013.01); *G02F 2001/13415* (2013.01); *G02F 2201/128* (2013.01); *G02F 2201/15* (2013.01)

(56) References Cited

U.S. PATENT DOCUMENTS

| | | | | |
|---|---|---|---|---|
| 2010/0110316 | A1 | 5/2010 | Huang et al. | |
| 2012/0162592 | A1* | 6/2012 | Takagi .................. | G02B 30/27 349/139 |
| 2013/0250188 | A1 | 9/2013 | Uehara et al. | |
| 2014/0063211 | A1* | 3/2014 | Fang ..................... | G02B 30/27 348/54 |
| 2015/0042938 | A1 | 2/2015 | Shi et al. | |
| 2015/0091886 | A1 | 4/2015 | Quan et al. | |

FOREIGN PATENT DOCUMENTS

| | | | |
|---|---|---|---|
| CN | 103323986 | A | 9/2013 |
| CN | 13353694 | A | 10/2013 |
| CN | 103424941 | A | 12/2013 |
| CN | 103454825 | A | 12/2013 |
| CN | 103676362 | A | 3/2014 |
| CN | 103913909 | A | 7/2014 |
| CN | 104460132 | A | 3/2015 |
| CN | 204269998 | U | 4/2015 |
| TW | I290252 | B | 11/2007 |

OTHER PUBLICATIONS

The First Chinese Office Action dated Oct. 8, 2016 Appln No. 201410784528.2.

USPTO FOA dated Jan. 12, 2018 in connection with U.S. Appl. No. 14/908,298.

USPTO NFOA dated Jun. 26, 2017 in connection with U.S. Appl. No. 14/908,298.

USPTO NFOA dated Jul. 27, 2018 in connection with U.S. Appl. No. 14/908,298.

USPTO NOA dated Jan. 29, 2019 in connection with U.S. Appl. No. 14/908,298.

USPTO NOA dated Apr. 23, 2019 in connection with U.S. Appl. No. 14/908,298.

USPTO RR dated Feb. 9, 2017 in connection with U.S. Appl. No. 14/908,298.

* cited by examiner

LIQUID CRYSTAL GRATING AND FABRICATION METHOD THEREOF, AND NAKED EYE 3D DISPLAY DEVICE

TECHNICAL FIELD

Embodiments of the present disclosure relate to a liquid crystal grating and a fabrication method thereof, and a display device.

BACKGROUND

A naked eye 3D display device includes a display panel and a liquid crystal grating. The liquid crystal grating for example is provided in front of the display panel, so that an image displayed by the naked eye 3D display device shows a 3D effect.

As shown in FIG. 1, the liquid crystal grating 1' comprises a first substrate 2', a liquid crystal layer 3' and a second substrate 4'. Wide strip-shaped transparent electrodes 5' are provided on the first substrate 2' at equal intervals, and a narrow strip-shaped transparent electrode 6' is provided between adjacent wide strip-shaped transparent electrodes 5'. A plate-shaped transparent electrode 7' is provided on the second substrate 4'. A voltage of the narrow strip-shaped transparent electrode 6' is same as a voltage of the plate-shaped transparent electrode 7'. In the case that there is an electric field between the wide strip-shaped transparent electrodes 5' and the plate-shaped transparent electrode 7', liquid crystal molecules in the liquid crystal layer 3' corresponding to positions of the wide strip-shaped transparent electrodes 5' are deflected. That is, in this case, the liquid crystal molecules in the liquid crystal layer 3' corresponding to the positions of the wide strip-shaped transparent electrodes 5' are deflected so that long axes thereof are perpendicular to the second substrate 4' and light cannot transmit through the liquid crystal grating 1', thereby forming light-shielding stripes. Since the voltage of the narrow strip-shaped transparent electrode 6' between the adjacent wide strip-shaped transparent electrodes 5' is the same as that of the plate-shaped transparent electrode 7', the liquid crystal molecules in the liquid crystal layer 3' corresponding to a gap between the adjacent wide strip-shaped transparent electrodes 5' are not deflected, so that light can transmit through the liquid crystal grating 1', thereby forming light-transmitting stripes.

As shown in FIG. 2, the liquid crystal grating 1' is in front of a display panel 8', and light-transmitting stripes 9' and light-shielding stripes 10' are alternately provided on the liquid crystal grating 1', so that a left eye 11' only sees a left-eye image and a right eye 12' only sees a right-eye image, thereby making the displayed image show the 3D effect.

Inventor of the present disclosure found that, as shown in FIG. 3, there is a certain included angle between an arrangement direction of the liquid crystal molecules in the liquid crystal layer 3' close to the first substrate 2' and the first substrate 2'. Therefore, there is a relatively large included angle between a direction of the electric field (indicated by dotted lines) between an edge 13' of the wide strip-shaped transparent electrode 5' and the plate-shaped transparent electrode 7' and an arrangement direction of the liquid crystal molecules provided outside the edge 13', and deflection states of the liquid crystal molecules provided outside the edge 13' may be affected by the electric field, so that the liquid crystal molecules provided outside the edge 13' deviate from their desired arrangement direction, resulting in a low light transmittance in the region of the liquid crystal molecules provided outside the edge 13', which is significantly lower than light transmittances of both sides of this region. In this case, a black stripe appears in a region indicated by the dotted box, so that the display device has a poor display effect.

SUMMARY

At least one embodiment of the present disclosure provides a liquid crystal grating and a fabrication method thereof, and a display device, for reducing the black stripe.

A liquid crystal grating provided by at least one embodiment of the present disclosure comprises a first substrate and a second substrate provided opposite to each other and a liquid crystal layer provided between the first substrate and the second substrate, a plate-shaped transparent substrate is provided on the first substrate. A second transparent conductive layer, a transparent insulating layer and a first transparent conductive layer are sequentially provided on the second substrate; the first transparent conductive layer includes first strip-shaped transparent electrodes and second strip-shaped transparent electrodes which are alternately provided, and there is a gap between the first strip-shaped transparent electrode and the second strip-shaped transparent electrode adjacent to each other; and the second transparent conductive layer includes third strip-shaped transparent electrodes provided at intervals.

For example, the third strip-shaped transparent electrode is provided at an edge of the first strip-shaped transparent electrode.

For example, a projection of the third strip-shaped transparent electrode on the second substrate overlaps with a projection of the first strip-shaped transparent electrode on the second substrate.

For example, a voltage of the second strip-shaped transparent electrode and a voltage of the third strip-shaped transparent electrode are same as a voltage of the plate-shaped transparent electrode and are different from a voltage of the first strip-shaped transparent electrode.

For example, a side of the third strip-shaped transparent electrode overlaps with a side of one of the first strip-shaped transparent electrodes, and the other side of the third strip-shaped transparent electrode at most extends to an edge of a next first strip-shaped transparent electrode next to the one of the first strip-shaped transparent electrodes.

For example, the other side of the third strip-shaped transparent electrode extends to a position between the one of the first strip-shaped transparent electrodes and the second strip-shaped transparent electrode adjacent to the one of the first strip-shaped transparent electrodes.

For example, the first strip-shaped transparent electrode has a width of 419.32 μm, and the second strip-shaped transparent electrode has a width of 84.83 μm.

For example, the third strip-shaped transparent electrode has a width of 3 μm, and an overlapping width between the third strip-shaped transparent electrode and the one of the first strip-shaped transparent electrodes is 1.15 μm.

For example, the other side of the third strip-shaped transparent electrode extends to a region where the second strip-shaped transparent electrode adjacent to the one of the first strip-shaped transparent electrodes is provided.

For example, the other side of the third strip-shaped transparent electrode extends to a region between the second strip-shaped transparent electrode adjacent to the one of the first strip-shaped transparent electrodes and the next first strip-shaped transparent electrode.

For example, the other side of the third strip-shaped transparent electrode extends to a position where the edge of the next first strip-shaped transparent electrode is provided.

For example, a side of the third strip-shaped transparent electrode is provided at an edge of one of the first strip-shaped transparent electrodes, and the other side of the third strip-shaped transparent electrode at most extends to an edge of a next first strip-shaped transparent electrode next to the one of the first strip-shaped transparent electrodes.

For example, there is a gap between a side of the third strip-shaped transparent electrode and an edge of one of the first strip-shaped transparent electrodes, and the other side of the third strip-shaped transparent electrode at most extends to an edge of a next first strip-shaped transparent electrode next to the one of the first strip-shaped transparent electrodes.

For example, the gap has a width less than 1 μm.

For example, a width of the first strip-shaped transparent electrode is greater than a width of the second strip-shaped transparent electrode and a width the third strip-shaped transparent electrode.

At least one embodiment of the present disclosure further provides a display device, and the display device comprises any array substrate described above.

At least one embodiment of the present disclosure further provides a fabrication method of a liquid crystal grating, and the method comprises: forming a transparent conductive layer on a first substrate, and forming a pattern including a plate-shaped transparent electrode by a patterning process; forming a second transparent conductive layer on a second substrate, and forming a pattern including third strip-shaped transparent electrodes provided at intervals by a patterning process; forming a transparent insulating layer on the second substrate where the second transparent conductive layer has been formed; forming a first transparent conductive layer on the second substrate where the transparent insulating layer has been formed, forming a pattern including first strip-shaped transparent electrodes and second strip-shaped transparent electrodes by a patterning process, the first strip-shaped transparent electrodes and the second strip-shaped transparent electrodes being alternately provided, and there being a gap between the first strip-shaped transparent electrode and the second strip-shaped transparent electrode adjacent to each other; and dripping off liquid crystal molecules on the first substrate or the second substrate, and bonding the first substrate and the second substrate to form the liquid crystal grating.

For example, a voltage of the second strip-shaped transparent electrode and a voltage of the third strip-shaped transparent electrode are same as a voltage of the plate-shaped transparent electrode and are different from a voltage of the first strip-shaped transparent electrode.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

REFERENCE SIGNS

1—first substrate; 2—second substrate; 3—plate—shaped transparent electrode; 4—second transparent conductive layer; 41—third strip—shaped transparent electrode; 5—transparent insulating layer; 6—first transparent conductive layer; 61—first strip—shaped transparent electrode; 62—second strip—shaped transparent electrode; 7—liquid crystal layer.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the disclosure.

Embodiment 1

Figure 4:
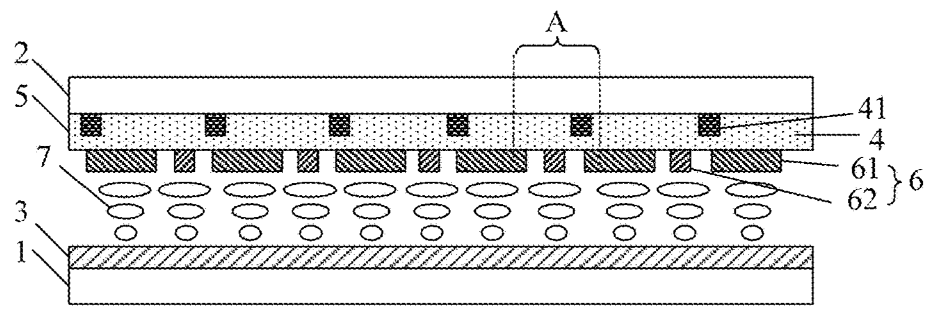
FIG. 4 is a cross-sectional schematic view illustrating a first type of liquid crystal grating in an embodiment of the present disclosure.

An embodiment of the present disclosure provides a liquid crystal grating; as shown in FIG. 4, the liquid crystal grating comprises: a first substrate 1 and a second substrate 2 provided opposite to each other and a liquid crystal layer 7 provided between the first substrate 1 and the second substrate 2. A plate-shaped transparent electrode 3 is provided on the first substrate 1. A second transparent conductive layer 4, a transparent insulating layer 5 and a first transparent conductive layer 6 are sequentially provided on the second substrate 2. The first transparent conductive layer 6 includes first strip-shaped transparent electrodes 61 and second strip-shaped transparent electrodes 62 which are alternately provided, and there is a gap between the first strip-shaped transparent electrode 61 and the second strip-shaped transparent electrode 62 adjacent to each other. The second transparent conductive layer 4 includes third strip-shaped transparent electrodes 41 provided at intervals.

For example, the third strip-shaped transparent electrode 41 is provided at an edge of the first strip-shaped transparent electrode 61, but is not limited thereto.

For example, a projection of the third strip-shaped transparent electrode 41 on the second substrate overlaps with a projection of the first strip-shaped transparent electrode 61 on the second substrate. The third strip-shaped transparent electrodes 41 and the first strip-shaped transparent electrodes 61 are not provided in a same layer, and the transparent insulating layer 5 is provided between a layer in which the third strip-shaped transparent electrodes 41 are provided and a layer in which the first strip-shaped transparent electrodes 61 are provided. Here, "overlapping" for example refers to that projections on the second substrate have an overlapping portion.

It should be noted that, the projection of the third strip-shaped transparent electrode 41 on the second substrate may not overlap with the projection of the first strip-shaped transparent electrode 61 on the second substrate. That is, there may not have an overlapping portion between the projection of the third strip-shaped transparent electrode 41 on the second substrate and the projection of the first strip-shaped transparent electrode 61 on the second substrate.

For example, a voltage of the second strip-shaped transparent electrode 62 and a voltage of the third strip-shaped transparent electrode 41 are same as a voltage of the plate-shaped transparent electrode 3, and are different from a voltage of the first strip-shaped transparent electrode 61. That is, the voltage applied to the second strip-shaped transparent electrode 62 and the voltage applied to the third strip-shaped transparent electrode 41 are same as the voltage applied to the plate-shaped transparent electrode 3, and are different from the voltage applied to the first strip-shaped transparent electrode 61.

Figure 1:
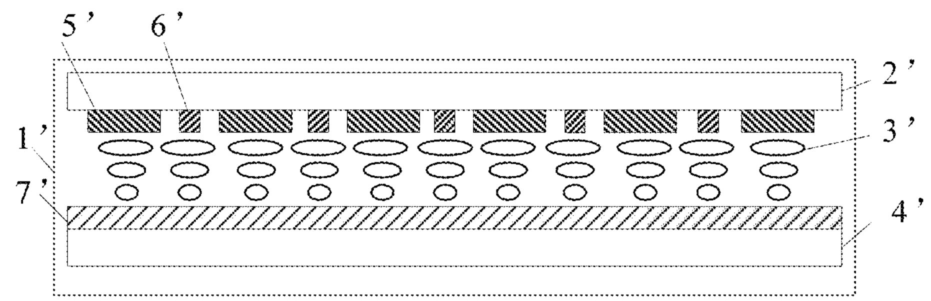
FIG. 1 is a cross-sectional schematic view illustrating a liquid crystal grating.
Figure 2:
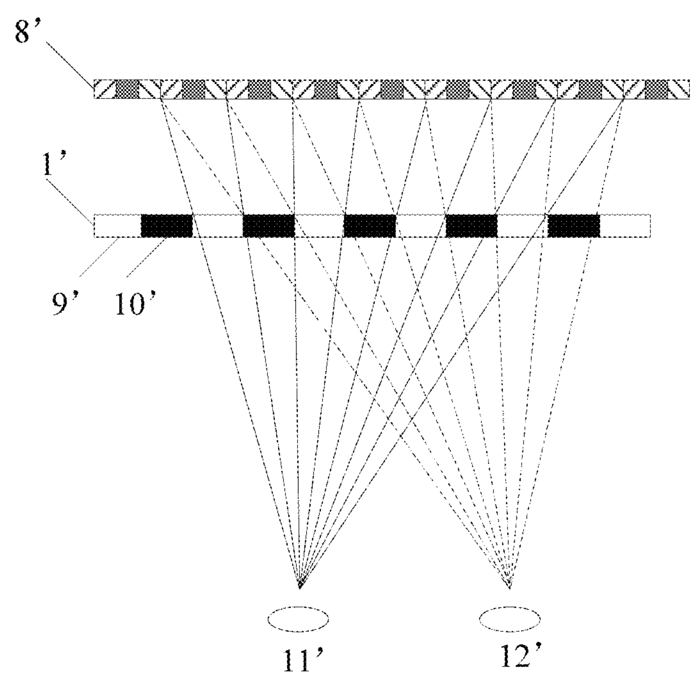
FIG. 2 is a principle schematic view illustrating that a displayed image shows a 3D effect by the liquid crystal grating.
Figure 3:
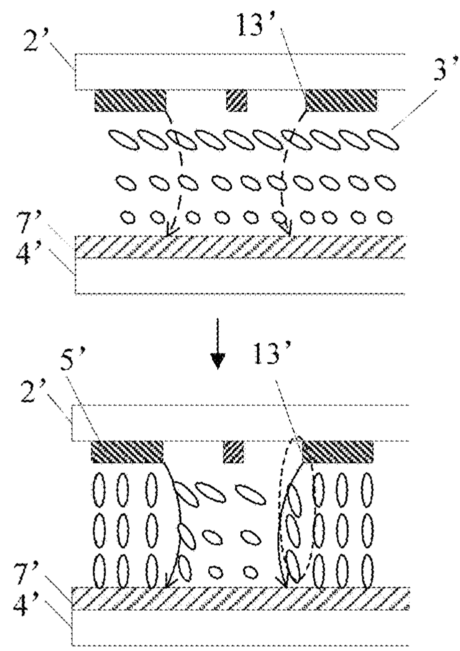
FIG. 3 is a principle schematic view illustrating that a black stripe appears in the displayed image due to the liquid crystal grating.

For example, as shown in FIG. 3, there is a certain included angle between an arrangement direction of the liquid crystal molecules in the liquid crystal layer 3' close to the second substrate 4' and the second substrate 4'. Therefore, there is a relatively large included angle between a direction of the electric field (indicated by dotted lines) between an edge 13' of the wide strip-shaped transparent electrode 5' on the second substrate 4' and the plate-shaped transparent electrode 7' and an arrangement direction of the liquid crystal molecules provided outside the edge 13', so that the liquid crystal molecules provided outside the edge 13' are affected by the electric field to deviate from their desired arrangement direction and light cannot transmit, and thus a black strip is formed in the displayed image corresponding to a region indicated by the dotted box.

Figure 5:
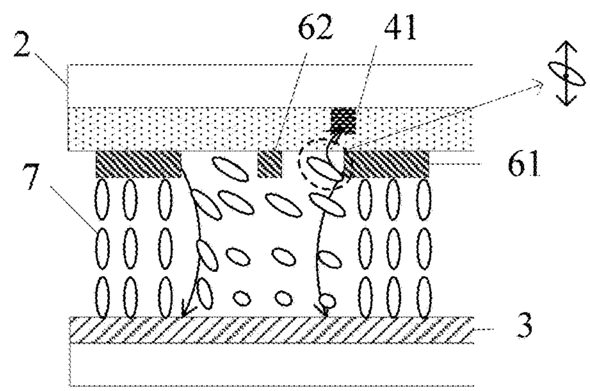
FIG. 5 is a principle schematic view illustrating that a black stripe is reduced by third strip-shaped transparent electrodes in an embodiment of the present disclosure.

As shown in FIG. 5, in the embodiment of present disclosure, the second substrate 2 has the third strip-shaped transparent electrodes 41 provided at intervals, and the voltage of the second strip-shaped transparent electrode 62 and the voltage of the third strip-shaped transparent electrode 41 are same as the voltage of the plate-shaped transparent electrode 3, and are different from the voltage of the first strip-shaped transparent electrode 61. Thus, in the case that there is an electric field between the first strip-shaped transparent electrode 61 and the plate-shaped transparent electrode 3, there is also an electric field between the third strip-shaped transparent electrode 41 and the first strip-shaped transparent electrode 61, and forces applied to the liquid crystal molecules by components of the above two electric fields in a vertical direction offset each other, so as not to make the liquid crystal molecules deflect, thereby reducing influence of the electric field between the first strip-shaped transparent electrode 61 and the plate-shaped transparent electrode 3 on deflection states of the liquid crystal molecules provided outside the first strip-shaped transparent electrode 61, to make light transmit. Furthermore, there is no electric flied between the third strip-shaped transparent electrode 41 and the second strip-shaped transparent electrode 62 and there is no electric flied between the third strip-shaped transparent electrode 41 and the plate-shaped transparent electrode 3; and therefore, the third strip-shaped transparent electrode 41 does not affect the deflection states of other liquid crystal molecules. In this way, the liquid crystal grating according to the embodiment of the disclosure can reduce the black stripe, thereby improving a display effect of the display device.

For example, the third strip-shaped transparent electrodes 41 are provide in the following three manners.

First manner: as shown in FIG. 4, a side of the third strip-shaped transparent electrode 41 overlaps with a side of one of the first strip-shaped transparent electrodes 61, and the other side of the third strip-shaped transparent electrode 41 at most extends to an edge of a next first strip-shaped transparent electrode 61 next to the one of the first strip-shaped transparent electrodes 61. For example, a width of a region where the side of the third strip-shaped transparent electrode 41 is overlapped with the side of the first strip-shaped transparent electrode 61 is controlled within 1.2 μm; in this case, the electric filed between the third strip-shaped transparent electrode 41 and the first strip-shaped transparent electrode 61 does not affect deflections of the liquid crystal molecules provided at the position of the first transparent electrode 61, and at the same time reduces influence of the electric field between the side of the first strip-shaped transparent electrode 61 and the plate-shaped transparent electrode 3 on the liquid crystal molecules.

Figure 6:
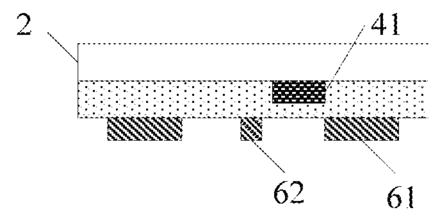
FIG. 6 is a partial cross-sectional schematic view illustrating a second type of liquid crystal grating in an embodiment of the present disclosure.

Second manner: as shown in FIG. 6, the side of the third strip-shaped transparent electrode 41 is provided at an edge of one of the first strip-shaped transparent electrodes 61, and the other side of the third strip-shaped transparent electrode 41 extends to an edge of a next second strip-shaped transparent electrode 62 next to the one of the first strip-shaped transparent electrodes 61. For example, the other side of the third strip-shaped transparent electrode 41 at most extends to the edge of the next first strip-shaped transparent electrode 61 next to the one of the first strip-shaped transparent electrodes 61.

Figure 7:
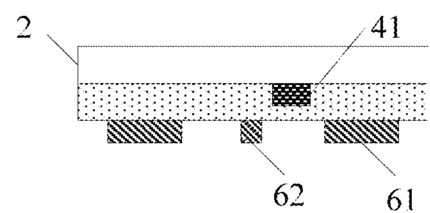
FIG. 7 is a partial cross-sectional schematic view illustrating a third type of liquid crystal grating in an embodiment of the present disclosure.

Third manner: as shown in FIG. 7, there is a gap between the side of the third strip-shaped transparent electrode 41 and the edge of one of the first strip-shaped transparent electrodes 61, and there is a gap between the other side of the third strip-shaped transparent electrode 41 and the edge of the next second strip-shaped transparent electrode 62. For example, the other side of the third strip-shaped transparent electrode 41 at most extends to the edge of the next first strip-shaped transparent electrode 61. For example, the gap between the side of the third strip-shaped transparent electrode 41 and the edge of the one of the first strip-shaped transparent electrode 61 has a width less than 1 nm, so as to make the electric field between the third strip-shaped transparent electrode 41 and the first strip-shaped transparent electrode 61 reduce influence of the electric field between the side of the first strip-shaped transparent electrode 61 and the plate-shaped transparent electrode 3 on the liquid crystal molecules.

Of course, besides the three manners described above, the third strip-shaped transparent electrodes 41 may be provided in other manners, as long as influence of the electric field between the side of the first strip-shaped transparent electrode 61 and the plate-shaped transparent electrode 3 on the liquid crystal molecules is reduced, which will not be limited here.

Among the three manners for proving the third strip-shaped transparent electrodes 41 as described above, in the case where the side of the third strip-shaped transparent electrode 41 overlaps with the side of one of the first strip-shaped transparent electrodes 61, the effect of reducing the black stripe is best. Therefore, the first manner in the embodiment of the present disclosure is more conducive to reducing the black stripe. Further, based on the first manner, the present embodiment provides four specific cases that "the other side of the third strip-shaped transparent electrode 41 at most extends to the edge of the next first strip-shaped transparent electrode 61".

First case: as shown in FIG. 4, the other side of the third strip-shaped transparent electrode 41 extends to a position between the one of the first strip-shaped transparent electrodes 61 and the second strip-shaped transparent electrode 62 adjacent to the one of the first strip-shaped transparent electrodes 61. For example, on a condition of reducing influence of the electric field between the side of the first strip-shaped transparent electrode 61 and the plate-shaped transparent electrode 3 on the liquid crystal molecules, the third strip-shaped transparent electrode 41 should have a width as small as possible, to increase light transmittance. Of course, the width of the third strip-shaped transparent electrode 41 may be determined according to actual demands, which will not be limited.

Figure 8:
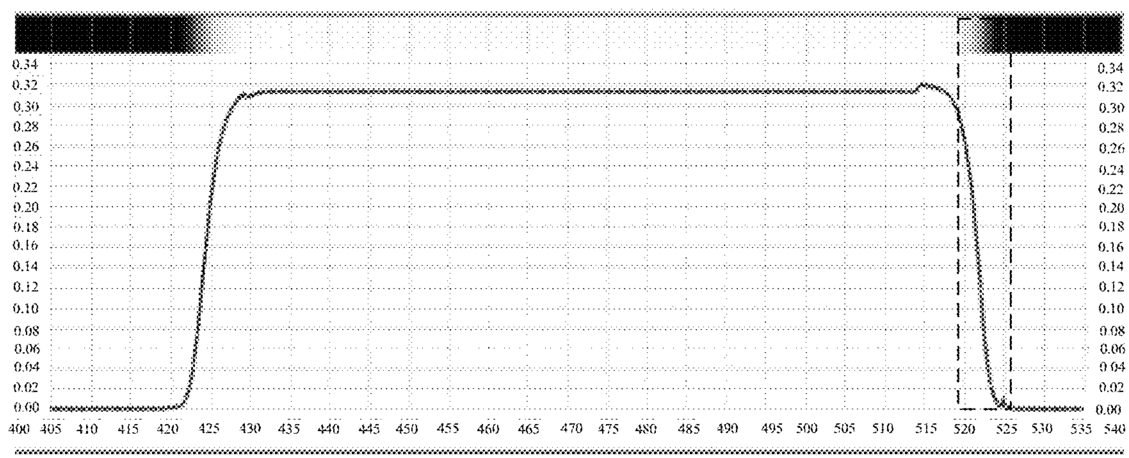
FIG. 8 is an analog schematic view illustrating a transmittance in a region A of FIG. 4 in the embodiment of the present disclosure.

For example, in the first case, the first strip-shaped transparent electrode 61 has a width of 419.32 μm, and the second strip-shaped transparent electrode 62 has a width of 84.83 μm. In this case, the third strip-shaped transparent electrode 41 has a width of 3 μm, and an overlapping width between the third strip-shaped transparent electrode 41 and the one of the first strip-shaped transparent electrodes 61 is 1.15 μm. In this case, a light transmittance in a region A of FIG. 4 is shown in FIG. 8. In FIG. 8, a horizontal coordinate denotes position, a vertical coordinate denotes light transmittance, and a region indicated by dotted box corresponds to a region where the black stripe appears in the prior art. It can be seen from FIG. 8 that, in the region indicated by dotted box, the light transmittance gradually changes, the light transmittance of each position is lower than that of a left position thereof and higher than that of a right position thereof, and no such a position has the light transmittance less than the light transmittance of the positions on both sides thereof. In this case, influence of the electric field between the side of the first strip-shaped transparent electrode 61 and the plate-shaped transparent electrode 3 on the liquid crystal molecules is eliminated by providing the third strip-shaped transparent electrodes 41, making light transmit normally, thereby eliminating the black stripe. Meanwhile, due to increase of light transmittance, a display brightness of the displayed image is improved.

Figure 9:
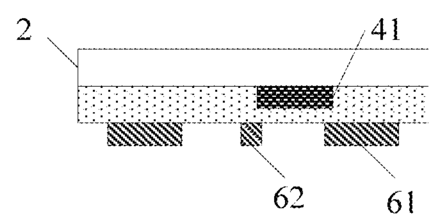
FIG. 9 is a partial cross-sectional schematic view illustrating a fourth type of liquid crystal grating in an embodiment of the present disclosure.
Figure 10:
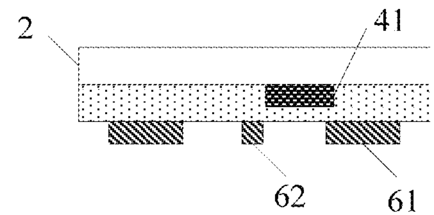
FIG. 10 is a partial cross-sectional schematic view illustrating a fifth type of liquid crystal grating in an embodiment of the present disclosure.
Figure 11:
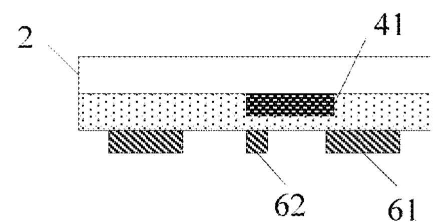
FIG. 11 is a partial cross-sectional schematic view illustrating a sixth type of liquid crystal grating in an embodiment of the present disclosure.

Second case: as shown in FIGS. 9 to 11, the other side of the third strip-shaped transparent electrode 41 extends to a region where the second strip-shaped transparent electrode 62 adjacent to the one of the first strip-shaped transparent electrodes 61 is provided.

In the second case, the other side of the third strip-shaped transparent electrode 41 extends to the region where the second strip-shaped transparent electrode 62 adjacent to the one of the first strip-shaped transparent electrodes 61 is provided, which may include: as shown in FIG. 9, the other side of the third strip-shaped transparent electrode 41 extends to an intermediate portion of the second strip-shaped transparent electrode 62 adjacent to the one of the first strip-shaped transparent electrodes 61; or, as shown in FIG. 10, the other side of the third strip-shaped transparent electrode 41 extends to the edge of the second strip-shaped transparent electrode 62 adjacent to the one of the first strip-shaped transparent electrodes 61; or, as shown in FIG. 11, the other side of the third strip-shaped transparent electrode 41 extends to the other edge of the second strip-shaped transparent electrode 62 adjacent to the one of the first strip-shaped transparent electrodes 61.

Figure 12:
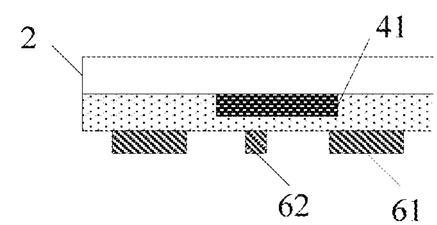
FIG. 12 is a partial cross-sectional schematic view illustrating a seventh type of liquid crystal grating in an embodiment of the present disclosure.

Third case: as shown in FIG. 12, the other side of the third strip-shaped transparent electrode 41 extends to a region between the second strip-shaped transparent electrode 62 adjacent to the one of the first strip-shaped transparent electrodes 61 and the next first strip-shaped transparent electrode 61.

Figure 13:
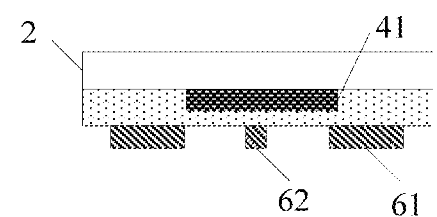
FIG. 13 is a partial cross-sectional schematic view illustrating an eighth type of liquid crystal grating in an embodiment of the present disclosure.

Fourth case: as shown in FIG. 13, the other side of the third strip-shaped transparent electrode 41 extends to a position where the edge of the next first strip-shaped transparent electrode 61 is provided. In this case, the other side of the third strip-shaped transparent electrode 41 does not overlap with the edge of the next first strip-shaped transparent electrode 61.

In the four cases described above, the light transmittance is relatively high in the first case. That is, the other side of the third strip-shaped transparent electrode 41 extends to the region between the one of the first strip-shaped transparent electrodes 61 and the second strip-shaped transparent electrode 62 adjacent to the one of the first strip-shaped transparent electrodes 61. In this case, the third strip-shaped transparent electrode 41 has a small width, so that the light transmittance is relatively high and the display brightness of the displayed image is high.

Of course, besides the above four cases, in the first manner, "the other side of the third strip-shaped transparent electrode 41 at most extends to the edge of the next first strip-shaped transparent electrodes 61" may further include other cases, as long as influence of the electric field between the side of the first strip-shaped transparent electrode 61 and the plate-shaped transparent electrode 3 on the liquid crystal molecules is reduced, which will not be limited here.

In addition, in the second manner and the third manner, specific cases of "the other side of the third strip-shaped transparent electrode 41 at most extends to the edge of the next first strip-shaped transparent electrodes 61" may refer to corresponding cases in the first manner, which will not be repeated here.

For example, the first strip-shaped transparent electrode 61 is wider than the second strip-shaped transparent electrode 62 and the third strip-shaped transparent electrode 41, which is conducive to the displayed image showing a 3D effect. And, the first strip-shaped transparent electrode 61, the second strip-shaped transparent electrode 62 and the third strip-shaped transparent electrode 41, for example, are made of indium tin oxide.

The embodiment of the present disclosure provides the liquid crystal grating, and the liquid crystal grating comprises the first substrate and the second substrate provided opposite to each other, and the liquid crystal layer provided between the first substrate and the second substrate; the plate-shaped transparent electrode provided on the first substrate; the second transparent conductive layer, the transparent insulating layer and the first transparent conductive layer are sequentially provided on the second substrate; the first transparent conductive layer includes the first strip-shaped transparent electrodes and the second strip-shaped transparent electrodes which are alternately provided, there is the gap between the first strip-shaped transparent electrode and the second strip-shaped transparent electrode adjacent to each other, and the second transparent conductive layer includes the third strip-shaped transparent electrodes provided at intervals. Because the voltage of the second strip-shaped transparent electrode and the voltage of the third strip-shaped transparent electrode are same as that of the plate-shaped transparent electrode and are different from that of the first strip-shaped transparent electrode, in the case that there is the electric field between the first strip-shaped transparent electrode and the plate-shaped transparent electrode, there is the electric field between the third strip-shaped transparent electrode and the first strip-shaped transparent electrode, and forces applied to the liquid crystal molecules by components of the two electric fields in the vertical direction offset each other, so as not to make the liquid crystal molecules deflect, thereby reducing influence of the electric field between the first strip-shaped transparent electrode and the plate-shaped transparent electrode on deflection states of the liquid crystal molecules provided outside the first transparent electrode, to make light transmit. And, there is no electric flied between the third strip-shaped transparent electrode and the second strip-shaped transparent electrode and there is no electric field between the third strip-shaped transparent electrode and the plate-shaped transparent electrode, and therefore, the third strip-shaped transparent electrode does not affect the deflection states of the other liquid crystal molecules. In this way, the liquid crystal grating can reduce the black stripe, thereby improving the display effect of the display device.

In addition, an embodiment of the disclosure further provides a display device, and the display device comprises the liquid crystal grating in the above embodiments. For example, the display device may be: a display device such as a liquid crystal display panel, an Organic Light-Emitting Diode (OLED) panel and so on, and a tablet personal computer, a television, a notebook computer, a mobile phone, a watch, a digital camera, a navigator, and any other product or component having a naked eye 3D display function including these display devices.

Embodiment II

Figure 14:
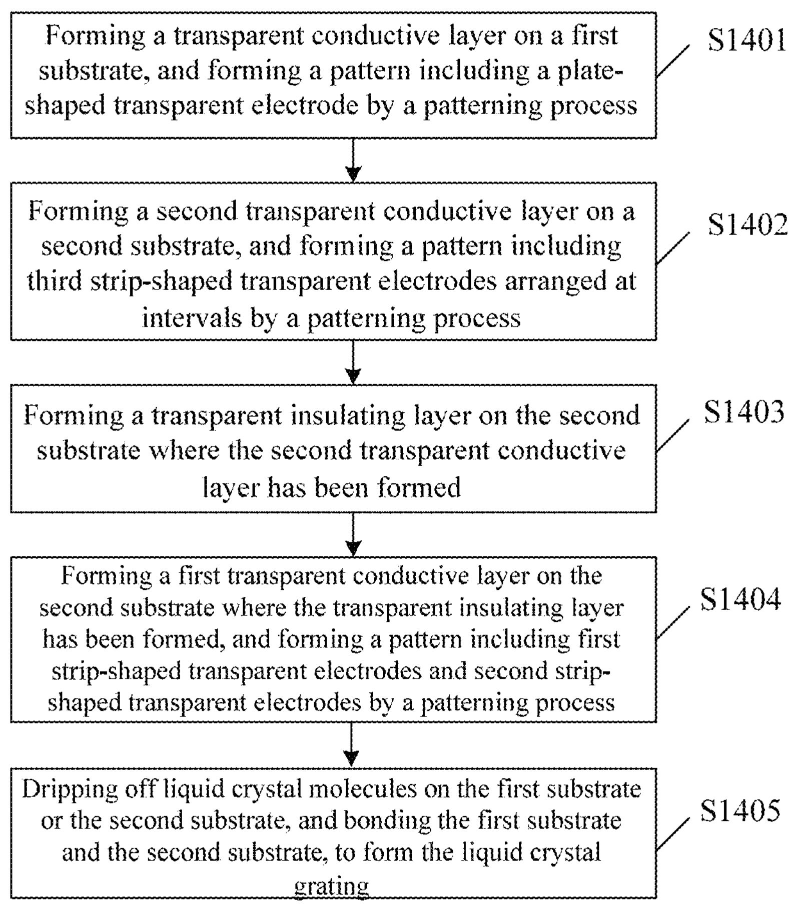
FIG. 14 is a flow chart of a fabrication method of a liquid crystal grating in an embodiment of the present disclosure.

An embodiment of the present disclosure further provides a fabrication method of the liquid crystal grating described in Embodiment I. As shown in FIG. 14, the method comprises steps of:

Step S1401: forming a transparent conductive layer on a first substrate, and forming a pattern including a plate-shaped transparent electrode by a patterning process.

Step S1402: forming a second transparent conductive layer on a second substrate, and forming a pattern including third strip-shaped transparent electrodes provided at intervals by a patterning process.

Step S1403: forming a transparent insulating layer on the second substrate where the second transparent conductive layer has been formed.

Step S1404: forming a first transparent conductive layer on the second substrate where the transparent insulating layer has been formed, and forming a pattern including first strip-shaped transparent electrodes and second strip-shaped transparent electrodes by a patterning process.

For example, the first strip-shaped transparent electrodes 61 and the second strip-shaped transparent electrodes 62 are provided alternately, and there is a gap between the first strip-shaped transparent electrode 61 and the second strip-shaped transparent electrode 62 adjacent to each other.

For example, a voltage of the second strip-shaped transparent electrode 62 and a voltage of the third strip-shaped transparent electrode 41 are same as a voltage of the plate-shaped transparent electrode 3 and are different from a voltage of the first strip-shaped transparent electrode 61.

Step S1405: dripping off liquid crystal molecules on the first substrate or the second substrate, and bonding the first substrate and the second substrate to form the liquid crystal grating.

The embodiment of the present disclosure provides the fabrication method of the liquid crystal grating. In the liquid crystal grating fabricated by the fabrication method of the liquid crystal grating described above, there comprised the third strip-shaped transparent electrodes provided at intervals, and the voltage of the second strip-shaped transparent electrode and the voltage of the third strip-shaped transparent electrode are same as that of the plate-shaped transparent electrode and are different from that of the first strip-shaped transparent electrode; in the case that there is the electric field between the first strip-shaped transparent electrode and the plate-shaped transparent electrode, there is the electric field between the third strip-shaped transparent electrode and the first strip-shaped transparent electrode, and forces applied to the liquid crystal molecules by components of the two electric fields in the vertical direction offset each other, so as not to make the liquid crystal molecules deflect, thereby reducing influence of the electric field between the first strip-shaped transparent electrode and the plate-shaped transparent electrode on deflection states of the liquid crystal molecules provided outside the first transparent electrode, to make light transmit. And, there is no electric flied between the third strip-shaped transparent electrode and the second strip-shaped transparent electrode and there is no electric flied between the third strip-shaped transparent electrode and the plate-shaped transparent electrode. Therefore, the third strip-shaped transparent electrode does not affect the deflection states of the other liquid crystal molecules, so that the liquid crystal grating can reduce the black stripe, thereby improving the display effect of the display device.

The foregoing are only specific embodiments of the present disclosure, but the protection scope of the present disclosure is not limited thereto. In the technical scope disclosed by the present disclosure, changes or substitutions easily thought by any skilled in the art are all covered in the protection scope of the present disclosure. Therefore, the protection scope of the present disclosure should be the protection scope of the claims.

The application claims priority of Chinese Patent Application No. 201410784528.2 filed on Dec. 16, 2014, the disclosure of which is incorporated herein by reference in its entirety as part of the present application.

The invention claimed is:

1. A liquid crystal grating, comprising a first substrate and a second substrate provided opposite to each other and a liquid crystal layer provided between the first substrate and the second substrate, a plate-shaped transparent electrode being provided on the first substrate, wherein, a second transparent conductive layer, a transparent insulating layer and a first transparent conductive layer are sequentially provided on the second substrate;

the first transparent conductive layer includes first strip-shaped transparent electrodes and second strip-shaped transparent electrodes which are alternately provided, and a gap is between the first strip-shaped transparent electrode and the second strip-shaped transparent electrode adjacent to each other;

the second transparent conductive layer includes third strip-shaped transparent electrodes provided at intervals; and only one third strip-shaped transparent electrode with its entirety is provided in an orthographic projection, on the second transparent conductive layer, of a region of every two immediately adjacent first strip-shaped transparent electrodes and one second strip-shaped transparent electrode between the every two immediately adjacent first strip-shaped transparent electrodes;

a first one of the second strip-shaped transparent electrodes is at a first side of a first one of the first strip-shaped transparent electrodes and is immediately adjacent to the first one of the first strip-shaped transparent electrodes, and a second one of the second strip-shaped transparent electrodes is at a second side, which is opposite to the first side, of the first one of the first strip-shaped transparent electrodes and is immediately adjacent to the first one of the first strip-shaped transparent electrodes;

a second one of the first strip-shaped transparent electrodes is at a side, away from the first one of the first strip-shaped transparent electrodes, of the first one of the second strip-shaped transparent electrodes and is immediately adjacent to the first one of the second strip-shaped transparent electrodes, and a third one of the first strip-shaped transparent electrodes is at a side, away from the first one of the first strip-shaped transparent electrodes, of the second one of the second strip-shaped transparent electrodes and is immediately adjacent to the second one of the second strip-shaped transparent electrodes;

a width of each of the first strip-shaped transparent electrodes is greater than a width of each of the second strip-shaped transparent electrodes.

2. The liquid crystal grating according to claim 1, wherein, an edge of an orthographic projection, on the first transparent conductive layer, of the third strip-shaped transparent electrode is within a region of one of the first strip-shaped transparent electrodes, and the other edge of the orthographic projection, on the first transparent conductive layer, of the third strip-shaped transparent electrode at most extends to an edge, which is closest to the one of the first strip-shaped transparent electrodes, of a next first strip-shaped transparent electrode next to the one of the first strip-shaped transparent electrodes.

3. The liquid crystal grating according to claim 2, wherein, the other edge of the orthographic projection, on the first transparent conductive layer, of the third strip-shaped transparent electrode extends to a position between the one of the first strip-shaped transparent electrodes and the second strip-shaped transparent electrode adjacent to the one of the first strip-shaped transparent electrodes.

4. The liquid crystal grating according to claim 2, wherein, the other edge of the orthographic projection, on the first transparent conductive layer, of the third strip-shaped transparent electrode extends to a region of the second strip-shaped transparent electrode adjacent to the one of the first strip-shaped transparent electrodes.

5. The liquid crystal grating according to claim 2, wherein, the other edge of the orthographic projection, on the first transparent conductive layer, of the third strip-shaped transparent electrode extends to a region between the second strip-shaped transparent electrode adjacent to the one of the first strip-shaped transparent electrodes and the next first strip-shaped transparent electrode.

6. The liquid crystal grating according to claim 2, wherein, the other edge of the orthographic projection, on the first transparent conductive layer, of the third strip-shaped transparent electrode extends to a position of the edge of the next first strip-shaped transparent electrode is provided.

7. The liquid crystal grating according to claim 1, wherein, an edge of an orthographic projection, on the first transparent conductive layer, of the third strip-shaped transparent electrode is provided at a position of an edge of one of the first strip-shaped transparent electrodes, and the other edge of the orthographic projection, on the first transparent conductive layer, of the third strip-shaped transparent electrode at most extends to an edge, which is closest to the one of the first strip-shaped transparent electrodes, of a next first strip-shaped transparent electrode next to the one of the first strip-shaped transparent electrodes.

8. The liquid crystal grating according to claim 7, wherein, the other edge of the orthographic projection, on the first transparent conductive layer, of the third strip-shaped transparent electrode extends to a position between the one of the first strip-shaped transparent electrodes and the second strip-shaped transparent electrode adjacent to the one of the first strip-shaped transparent electrodes.

9. The liquid crystal grating according to claim 7, wherein, the other edge of the orthographic projection, on the first transparent conductive layer, of the third strip-shaped transparent electrode extends to a region of the second strip-shaped transparent electrode adjacent to the one of the first strip-shaped transparent electrodes.

10. The liquid crystal grating according to claim 7, wherein, the other edge of the orthographic projection, on the first transparent conductive layer, of the third strip-shaped transparent electrode extends to a region between the second strip-shaped transparent electrode adjacent to the one of the first strip-shaped transparent electrodes and the next first strip-shaped transparent electrode.

11. The liquid crystal grating according to claim 7, the other edge of the orthographic projection, on the first transparent conductive layer, of the third strip-shaped transparent electrode extends to a position of the edge of the next first strip-shaped transparent electrode is provided.

12. The liquid crystal grating according to claim 1, wherein, a gap is between an edge of an orthographic projection, on the first transparent conductive layer, of the third strip-shaped transparent electrode and an edge of one of the first strip-shaped transparent electrodes, and the other edge of the orthographic projection, on the first transparent conductive layer, of the third strip-shaped transparent electrode at most extends to an edge, which is closest to the one of the first strip-shaped transparent electrodes, of a next first strip-shaped transparent electrode next to the one of the first strip-shaped transparent electrodes.

13. The liquid crystal grating according to claim 12, wherein, the other edge of the orthographic projection, on the first transparent conductive layer, of the third strip-shaped transparent electrode extends to a position between the one of the first strip-shaped transparent electrodes and the second strip-shaped transparent electrode adjacent to the one of the first strip-shaped transparent electrodes.

14. The liquid crystal grating according to claim 12, wherein, the other edge of the orthographic projection, on the first transparent conductive layer, of the third strip-shaped transparent electrode extends to a region of the second strip-shaped transparent electrode adjacent to the one of the first strip-shaped transparent electrodes.

15. The liquid crystal grating according to claim 12, wherein, the other edge of the orthographic projection, on the first transparent conductive layer, of the third strip-shaped transparent electrode extends to a region between the second strip-shaped transparent electrode adjacent to the one of the first strip-shaped transparent electrodes and the next first strip-shaped transparent electrode.

16. The liquid crystal grating according to claim 12, wherein, the other edge of the orthographic projection, on the first transparent conductive layer, of the third strip-shaped transparent electrode extends to a position of the edge of the next first strip-shaped transparent electrode is provided.

17. The liquid crystal grating according to claim 1, wherein, a width of each of the first strip-shaped transparent electrodes is greater than a width of each of the third strip-shaped transparent electrodes.

18. The liquid crystal grating according to claim 1, wherein, a voltage of the second strip-shaped transparent electrode and a voltage of the third strip-shaped transparent electrode are same as a voltage of the plate-shaped transparent electrode and are different from a voltage of the first strip-shaped transparent electrode.

19. A display device, comprising the liquid crystal grating according to claim 1.

20. A fabrication method of a liquid crystal grating, comprising:

forming a transparent conductive layer on a first substrate, and forming a pattern including a plate-shaped transparent electrode by a patterning process;

forming a second transparent conductive layer on a second substrate, and forming a pattern including third strip-shaped transparent electrodes provided at intervals by a patterning process;

forming a transparent insulating layer on the second substrate where the second transparent conductive layer has been formed;

forming a first transparent conductive layer on the second substrate where the transparent insulating layer has been formed, forming a pattern including first strip-shaped transparent electrodes and second strip-shaped transparent electrodes by a patterning process, the first strip-shaped transparent electrodes and the second strip-shaped transparent electrodes being alternately provided, and a gap being between the first strip-shaped transparent electrode and the second strip-shaped transparent electrode adjacent to each other; and dripping off liquid crystal molecules on the first substrate or the second substrate, and bonding the first substrate and the second substrate to form the liquid crystal grating, wherein, only one third strip-shaped transparent electrode with its entirety is provided in an orthographic projection, on the second transparent conductive layer, of a region of every two immediately adjacent first strip-shaped transparent electrodes and one second strip-shaped transparent electrode between the every two immediately adjacent first strip-shaped transparent electrodes;

a first one of the second strip-shaped transparent electrodes is at a first side of a first one of the first strip-shaped transparent electrodes and is immediately adjacent to the first one of the first strip-shaped transparent electrodes, and a second one of the second strip-shaped transparent electrodes is at a second side, which is opposite to the first side, of the first one of the first strip-shaped transparent electrodes and is immediately adjacent to the first one of the first strip-shaped transparent electrodes;

a second one of the first strip-shaped transparent electrodes is at a side, away from the first one of the first strip-shaped transparent electrodes, of the first one of the second strip-shaped transparent electrodes and is immediately adjacent to the first one of the second strip-shaped transparent electrodes, and a third one of the first strip-shaped transparent electrodes is at a side, away from the first one of the first strip-shaped transparent electrodes, of the second one of the second strip-shaped transparent electrodes and is immediately adjacent to the second one of the second strip-shaped transparent electrodes;

a width of each of the first strip-shaped transparent electrodes is greater than a width of each of the second strip-shaped transparent electrodes.

* * * * *